Patented Sept. 1, 1931

1,821,859

UNITED STATES PATENT OFFICE

THEODOR THORSSELL AND AUGUST KRISTENSSON, OF KASSEL, GERMANY

PRODUCTION OF POTASSIUM NITRATE WITH SIMULTANEOUS OBTAINING OF DIMAGNESIUM PHOSPHATE

No Drawing. Application filed November 11, 1929, Serial No. 406,505, and in Germany November 28, 1928.

The decomposition of crude phosphates with $HNO_3$ and precipitation of the Ca with $K_2SO_4$ is known:

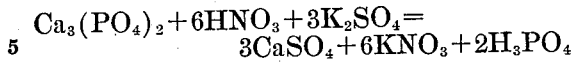
$$Ca_3(PO_4)_2 + 6HNO_3 + 3K_2SO_4 = 3CaSO_4 + 6KNO_3 + 2H_3PO_4$$

The present invention consists in the application of this process to the production of potassium nitrate, in which the phosphoric acid is removed from the solution which is obtained in the form of $MgHPO_4$. For this purpose the solution obtained after separation of the gypsum is mixed with $MgCO_3$, $Mg(OH)_2$ or $MgO$, or with a compound or mixture of these substances, and $MgHPO_4$ containing water of crystallization then precipitates out. The $MgHPO_4$ obtained, which contains the whole of the $P_2O_5$ in a form which is soluble in citric acid, is either used directly as a fertilizer or is further worked up for the purpose of producing a fertilizer.

In order to obtain pure $MgHPO_4$, the process is preferably carried out so that first of all only so much of the carbonate or hydrate or oxide of magnesium is added that about e. g. 1% $H_3PO_4$ remains in the solution, the $MgHPO_4$ which precipitates out is separated, and the remainder of the $H_3PO_4$ is precipitated from the solution as $Mg_3(PO_4)_2$ with a further quantity of magnesium carbonate. After the separation of this last precipitate a clear solution of $KNO_3$ free from phosphoric acid is obtained. The $KNO_3$ may be obtained from this solution by evaporation or cooling. In the latter case, the mother liquor is used in the decomposition of fresh quantities of crude phosphate or for the first washing out of the gypsum formed thereby, whereby the $KNO_3$ which has not separated out re-enters into the process.

The separated $Mg_3(PO_4)_2$ is jointly used in the precipitation of further quantities of $MgHPO_4$, so that all the phosphoric acid is obtained as $MgHPO_4$.

The processes are illustrated by the following equations:

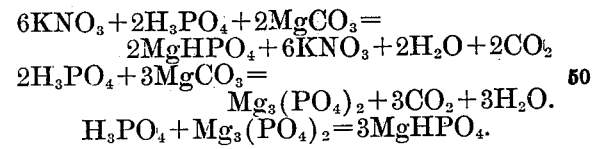
$$6KNO_3 + 2H_3PO_4 + 2MgCO_3 = 2MgHPO_4 + 6KNO_3 + 2H_2O + 2CO_2$$
$$2H_3PO_4 + 3MgCO_3 = Mg_3(PO_4)_2 + 3CO_2 + 3H_2O.$$
$$H_3PO_4 + Mg_3(PO_4)_2 = 3MgHPO_4.$$

The $MgHPO_4$ precipitates out in a crystalline form at a temperature of about 30° C. or above and is easy to separate from and to wash free from the $KNO_3$ solution.

Having now particularly described and ascertained the nature of our said invention and in what manner the same is to be performed we declare that what we claim is:—

1. In a process for decomposing crude phosphate with nitric acid and potassium sulphate with production of a solution containing potassium nitrate and phosphoric acid, the simultaneous recovery from said solution of the phosphoric acid as magnesium hydrogen phosphate and of the potassium nitrate, comprising the steps of nearly neutralizing the solution with a basic magnesium compound with separation of most of the phosphoric acid as magnesium hydrogen phosphate, and of completely freeing the solution from phosphoric acid by further neutralization with a basic magnesium compound with precipitation of said acid as magnesium orthophosphate.

2. A process as claimed in claim 1, and in which the said basic magnesium compound is selected from a group consisting of oxide, hydroxide, carbonate of magnesium and a mixture thereof.

3. A process as claimed in claim 1, and in which the magnesium orthophosphate is used for assisting in the precipitation of the magnesium hydrogen phosphate.

In testimony whereof we affix our signatures.

THEODOR THORSSELL.
AUGUST KRISTENSSON.